(12) United States Patent
Elliott, Jr. et al.

(10) Patent No.: US 7,895,333 B2
(45) Date of Patent: *Feb. 22, 2011

(54) ESTIMATING NETWORK MANAGEMENT BANDWIDTH

(75) Inventors: Ross Liles Elliott, Jr., Fort Worth, TX (US); Todd M. Meyer, Liberty Hill, TX (US); Dean Evans Qualls, Nashville, TN (US); Rodrigo Strougo, Acworth, GA (US)

(73) Assignee: International Business Machines Corporation, Armonk, NY (US)

( * ) Notice: Subject to any disclaimer, the term of this patent is extended or adjusted under 35 U.S.C. 154(b) by 292 days.

This patent is subject to a terminal disclaimer.

(21) Appl. No.: 12/110,076

(22) Filed: Apr. 25, 2008

(65) Prior Publication Data

US 2008/0201463 A1 Aug. 21, 2008

Related U.S. Application Data

(63) Continuation of application No. 10/411,418, filed on Apr. 10, 2003, now Pat. No. 7,403,998.

(51) Int. Cl.
*G06F 15/173* (2006.01)
(52) U.S. Cl. .................. 709/226; 709/223; 709/224
(58) Field of Classification Search .............. 709/224, 709/226, 223
See application file for complete search history.

(56) References Cited

U.S. PATENT DOCUMENTS

| | | | |
|---|---|---|---|
| 6,108,782 A | 8/2000 | Fletcher et al. | 713/153 |
| 6,182,157 B1 | 1/2001 | Schlener et al. | 709/318 |
| 6,278,694 B1 | 8/2001 | Wolf et al. | 370/253 |
| 6,327,620 B1 | 12/2001 | Tams et al. | 709/224 |
| 6,469,986 B1 | 10/2002 | Lecheler et al. | 370/252 |
| 7,551,550 B2 * | 6/2009 | Sinha | 370/217 |
| 2004/0120330 A1 * | 6/2004 | Rhine et al. | 370/408 |
| 2004/0146065 A1 | 7/2004 | Li et al. | 370/449 |
| 2008/0101460 A1 * | 5/2008 | Rodriguez | 375/240.01 |
| 2009/0070454 A1 * | 3/2009 | McKinnon et al. | 709/224 |

* cited by examiner

*Primary Examiner*—Karen C Tang
(74) *Attorney, Agent, or Firm*—VanLeeuwen & VanLeeuwen; Mark C. Vallone (57) ABSTRACT

Network management bandwidth is estimated. Customer requirements are mapped to device type categories. Bandwidth requirements for each device type category are calculated using unit fault requirements and unit performance requirements that are derived from fault attributes and performance attributes, respectively. Overhead bandwidth, polling equipment bandwidth, and web portal bandwidth are also calculated using the customer requirements. A network management bandwidth requirement is calculated using the device type bandwidth requirements, the overhead bandwidth requirement, the polling equipment bandwidth, and the web portal bandwidth requirement. The network management bandwidth requirement is used to select a suitable communications link to monitor and manage a customer's network.

7 Claims, 7 Drawing Sheets

*Figure 1*

| Device Type | Monitoring | # of Ports | Bandwidth Consumption Fault | Bandwidth Consumption Performance |
|---|---|---|---|---|
| IP Capable (Up/Down Only) | ICMP, PING | Per Interface | 0.013 | N/A |
| Single Int. MIB II (Up/Down Only) | ICMP, PING, SNMP | Per Interface | 0.025 | N/A |
| Single Int. MIB II | Full | Per Interface | 0.104 | 0.338 |
| Multi-Int. MIB II | Full | Multiple Interfaces | 0.104 | 0.338 |
| Very Large Router | Full | ≥ 75 | 13.427 | 4.934 |
| Large Router | Full | 36-74 | 5.443 | 2.025 |
| Medium Router | Full | 13-35 | 1.978 | 0.876 |
| Small Router | Full | 2-12 | 0.418 | 0.492 |
| Large Switch | Full | ≥ 72 | 10.553 | 3.849 |
| Medium Switch | Full | 36-71 | 5.210 | 1.672 |
| Small Switch | Full | 2-35 | 2.625 | 0.829 |

ESTIMATING NETWORK MANAGEMENT BANDWIDTH

RELATED APPLICATIONS

This application is a continuation application of U.S. Non-Provisional patent application Ser. No. 10/411,418, entitled "System and Method for Estimating Network Management Bandwidth," filed on Apr. 10, 2003 now U.S. Pat. No. 7,403,998.

BACKGROUND OF THE INVENTION

1. Technical Field

The present invention relates in general to a system and method for estimating network management bandwidth. More particularly, the present invention relates to a system and method for mapping customer requirements to device type categories and calculating a network management bandwidth using bandwidth requirements for each device type category.

2. Description of the Related Art

Internet growth of business-to-business and business-to-consumer transactions is increasing requirements for reliable, efficient, and resilient networks. In order for a business to be successful, it is imperative for a business's computer network to remain functioning. Computer networks are monitored and managed to ensure a business's computer network functionality. By monitoring and managing computer networks, issues may be resolved before the issues create business problems. For example, a malfunctioning router may be detected and taken offline before the malfunctioning router creates network problems for the business or the business's customers.

Often times, a third party at a remote location performs network management. When developing a strategy and communications infrastructure to monitor and manage a business's network, the third party attempts to estimate a suitable communications link to accommodate the network monitoring and management traffic. Network monitoring and management traffic may include Internet Control Message Protocol (ICMP) and Simple Network Management Protocol (SNMP) requests and replies, and administrative traffic for administration and hardware troubleshooting (i.e. telnet and remote control).

A challenge found, however, is that a third party may choose a communications link that is inadequate in an attempt to minimize costs at the risk of limiting the bandwidth to a point that the network management tools do not perform necessary operations in a timely and efficient manner.

Furthermore, a challenge found is that a third party may choose a communications link that is excessive in order to ensure that ample bandwidth is available. However, this approach results in provisioning more bandwidth than is actually required which translates to unnecessary re-occurring charges from a communications link service provider.

What is needed, therefore, is a system and method for estimating network management bandwidth such that suitable bandwidth is available for network management without incurring excessive bandwidth costs.

SUMMARY

It has been discovered that the aforementioned challenges are resolved by mapping customer requirements to device type categories and calculating a network management bandwidth requirement using the device type categories. Device type categories correspond to typical network equipment that is installed at a customer's facility. For example, device type categories may include various router sizes and various switch sizes (i.e. small, medium, and large).

A network management bandwidth calculator identifies fault attributes corresponding to each device type category. For example, a device type category may be a large router whereby the router's fault attributes include ICMP ping, status poll, and interface utilization messages. The network management bandwidth calculator determines attribute byte counts for each fault attribute, and calculates a unit fault requirement for each device type category which specifies a bandwidth required to support each device type's fault monitoring. The network management bandwidth calculator also calculates a unit performance requirement for each device type using performance attribute information.

The network management bandwidth calculator retrieves a customer's equipment monitoring requirements using an automated process or a manual process. In an automated example, a specialized scanning/discovery procedure may be used to gather the customer device information from a customer location. In a manual example, a customer may provide a list of equipment that the customer wishes to be monitored and managed. The network management bandwidth calculator maps each customer's equipment to a device type category. For example, the customer may have a Cisco 7500 router with 50 ports in which the network management bandwidth calculator maps the router and the quantity of routers to a device type category "Large Router".

The network management bandwidth calculator uses device type quantities, unit fault requirements, and unit performance requirements to calculate a device type total bandwidth requirement for each device type category. The network management bandwidth calculator also calculates bandwidth overhead (i.e. for bundled equipment) as well as remote polling bandwidth requirements using customer requirement information. The network management bandwidth calculator combines each device type total bandwidth requirement, the overhead bandwidth, and the remote polling bandwidth to generate a network management bandwidth requirement. The network management bandwidth requirement is used to determine a suitable communications link to monitor and manage a customer's network.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
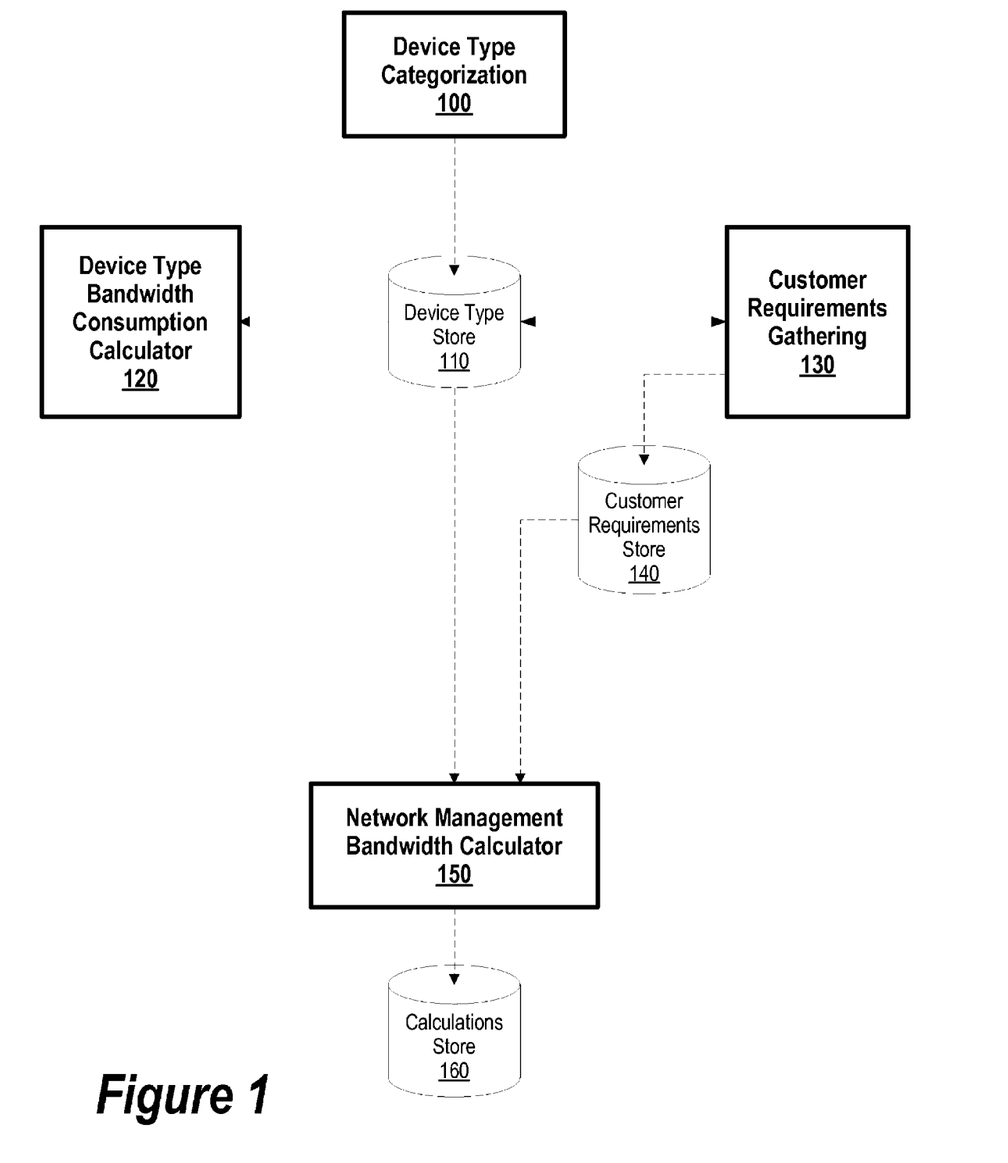
FIG. 1 is a high-level diagram showing a network bandwidth calculator using device type bandwidths and customer requirements to calculate a network management bandwidth estimation.

FIG. 1 is a high-level diagram showing a network bandwidth calculator using device type bandwidth requirements and customer requirements to calculate a network management bandwidth requirement. An important step in calculating network management bandwidth is to generate device type categories. Device type categorization 100 generates device type categories corresponding to typical network equipment that is installed at a customer's facility. For example, device type categorization 100 may create a range (i.e. small, medium, large, etc.) of router categories and a range of switch categories (see FIG. 2 and corresponding text for further details regarding device type categories). Device type categorization 100 stores the categorized device types in device type store 110. Device type store 110 may be stored on a non-volatile storage area, such as a computer hard drive.

Calculator 120 retrieves the device type categories from device type 110. Calculator 120 selects a first device type category and identifies fault attributes corresponding to the first device type category. For example, the first device type may be a large router whereby the router's fault attributes include ICMP ping, status poll, and interface utilization messages. Calculator 120 identifies each fault attribute corresponding to the first device type, determines an attribute byte count for each attribute, and calculates a unit fault requirement which specifies the bandwidth required for a particular device type's fault monitoring. Calculator 120 calculates a unit fault requirement for each device type category and stores each unit fault requirement in device type store 110. Calculator 120 also calculates a unit performance requirement for each device type using performance attribute information. The unit fault requirement and unit performance requirement are two unit bandwidth requirements that are used to calculate a network management bandwidth requirement (see FIGS. 3, 4, 5, 6, and corresponding text for further details regarding device type unit requirement and network management bandwidth requirement calculations).

Customer requirements gathering 130 retrieves a customer's equipment monitoring requirements using an automated process or a manual process. In an automated example, a specialized scanning/discovery procedure may be used to gather the customer device information from a customer location. In a manual example, a customer may provide a list of customer equipment that the customer wishes to be monitored and managed.

Customer requirements gathering 130 retrieves the device type categories from device type store 110, and maps the customer requirements to the device type categories. For example, the customer may have a Cisco 7500 router with 50 ports in which customer requirements gathering 130 maps the router to a device type category "large router" (see FIG. 4 and corresponding text for further details regarding equipment mapping). During the mapping process, customer requirements gathering 130 adds the customer's equipment quantity to corresponding device type categories located in device type store 110. Using the example described above, the customer may have 50 Cisco 7500 routers in which customer requirements gathering 130 adds "50" to the "Large Router" device type category. Customer requirements gathering 130 also stores requirement information corresponding to remote polling equipment in customer requirements store 140. Remote polling equipment may be used at a customer's location to offload various network management activities.

Calculator 150 retrieves device type quantities, unit fault requirements, and unit performance requirements from device type category bandwidths from device type 110, and calculates a device type total bandwidth requirement for each device type category. Calculator 150 also calculates bandwidth overhead (i.e. for bundled equipment) as well as remote polling bandwidth requirements using information retrieved from device type store 110 and customer requirements store 140 (see FIG. 5 and corresponding text for further details regarding network management bandwidth calculations). Calculator 150 combines each device type total bandwidth, the overhead bandwidth, and the remote polling bandwidth to generate a network management bandwidth requirement. Calculator 150 stores the network management bandwidth requirement in calculations store 160 whereupon a user retrieves the network management bandwidth requirement to identify a communications link requirement between the user and the customer's location.

Figure 2:
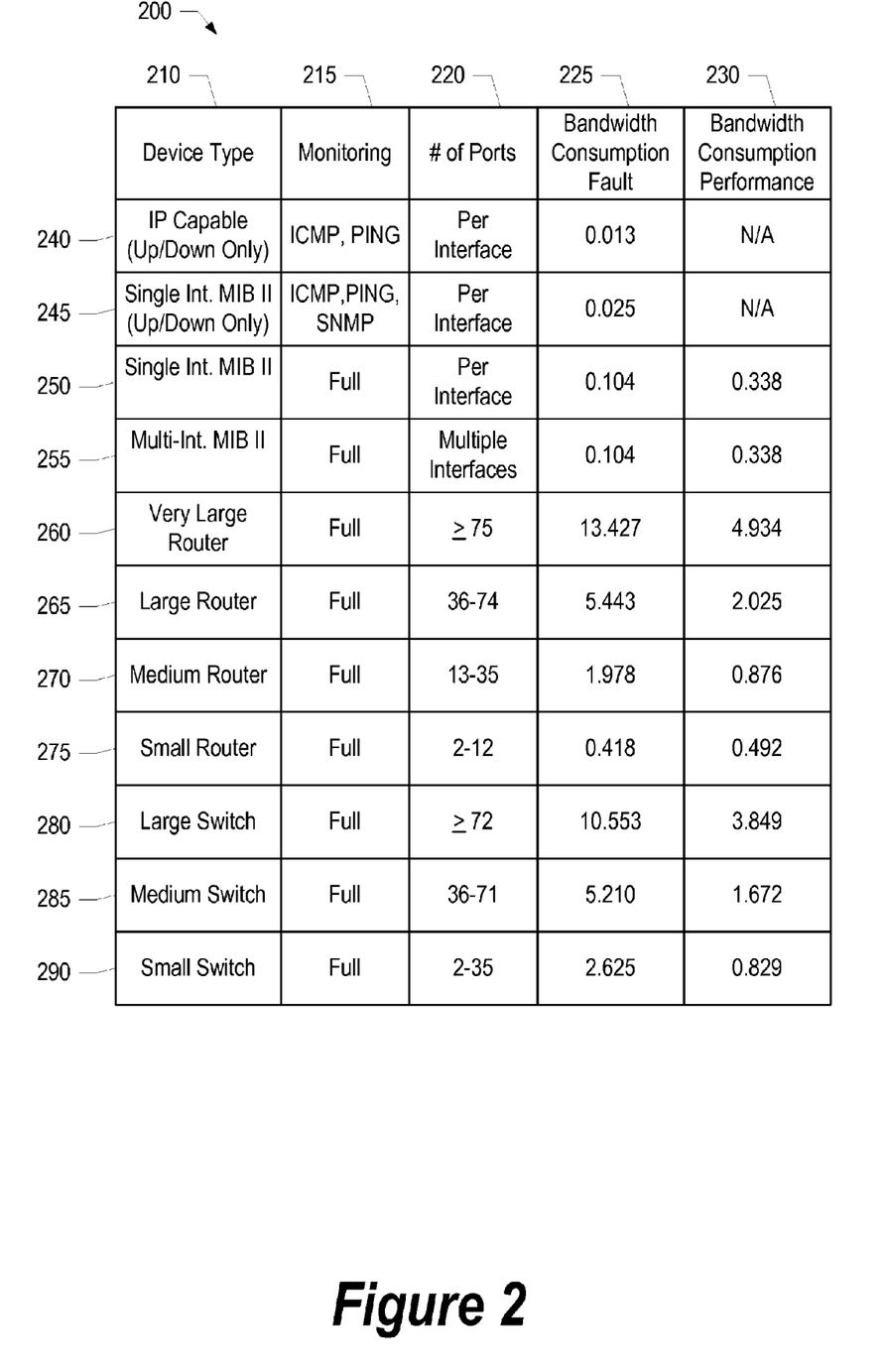
FIG. 2 is a look-up table showing device types and corresponding device type data.

FIG. 2 is a look-up table showing device types and corresponding device type data. Look-up table 200 includes column 210 which includes a list of device type categories. The device type categories are "generic" device types in which a customer's requirements may be mapped. For example, a customer may use a Cisco 7500 router with 80 ports whereby the router is mapped to a "very large router" (row 260).

Column 215 includes a list of monitoring capabilities for each device type category. For example, device type categories in row 240 and row 245 have "up/down" monitoring whereas rows 250 through 290 have "full" monitoring. Up/down monitoring is used when a customer wishes to know if a device is running or not running (e.g. up or down) and is not interested in customized monitoring for that particular device. Column 220 includes a list of port numbers corresponding to each device type category. For example, row 280 defines a "large switch" as a switch with greater than 72 ports.

Column 225 includes a list of device type total fault requirements corresponding to each device type category. The device type total fault requirements are calculated for each device type using fault attribute information corresponding to each device type category (see FIG. 3 and corresponding text for further details regarding device type total fault requirements). Column 230 includes a list of device type total performance requirements corresponding to each device type category. The device type total performance requirements are calculated for each device type using performance attribute information corresponding to each device type category.

Look-up table 200 includes eleven device type categories that are shown in rows 240 through 290. As one skilled in the art can appreciate, more or less device type categories may be used in order to map customer requirements to device type categories. Row 240 includes an "IP capable" device type with "up/down" monitoring. An IP capable device is an interface with an IP address that is only be monitored for up/down status information (i.e. functioning or not functioning). For example, an IP capable device may be a server that should be monitored and responds to ICMP requests or PING's. Row 245 includes a "Single Interface MIB II" device type with "up/down" monitoring. A single interface MIB II device can be a server or infrastructure device that has one network interface with an IP address and has an enabled and accessible SNMP agent that can be monitored for Up/Down status information. For example, a single interface MIB II device type may be a server to be monitored and responds to SNMP requests in addition to ICMP/PING requirements.

Row 250 includes a "Single Interface MIB II" device type with "Full" monitoring. A single interface MIB II device is an interface with an IP address on a device that has enabled and accessible SNMP agents and is fully managed by monitoring SNMP MIB II attribute values. For example, a server may be monitored that has one interface, responds to SNMP requests in addition to ICMP/PING, and is not a router or a switch (see below for router and switch categories).

Row 255 includes a "Multi-Interface MIB II" device type with "Full" monitoring. A multi-interface MIB II device is a device with multiple IP addressed interfaces with enabled and accessible SNMP agents and is status polled and managed by monitoring SNMP MIB II attribute values. For example, a device may be a server that is monitored and has more than one interface and responds to SNMP requests in addition to ICMP/PING, and is not a router or a switch (see below for router and switch categories).

Row 260 includes a "Very Large Router" device type with "Full" monitoring. A very large router is an SNMP manageable router with 75 ports or more. For example, a very large router is a Cisco 7500/12000 router with 12-ATM, 48-10/100 Ethernet, 12-Serial T1, 24-Serial Frame Relay and 24-TR interfaces.

Row 265 includes a "Large Router" device type with "Full" monitoring. A large router is an SNMP manageable router with 36-74 ports. For example, a large router is a Cisco 7500 with 4-ATM, 24-10/100 Ethernet, 2-Serial T1, 10-Serial Frame Relay and 8-TR interfaces. Row 270 includes a "Medium Router" device type with "Full" monitoring. A medium router is an SNMP manageable router with 13-35 ports. For example, a medium router is a Cisco 4500 with 12-10/100 Ethernet, 2-Serial T1, 2-Serial Frame Relay and 4-TR interfaces. Row 275 includes a "Small Router" device type with "Full" monitoring. A small router is an SNMP manageable router with 2-12 ports. For example, a small router is a Cisco 2500 with 2-10/100 Ethernet, 1-Serial T1 and 1-Serial Frame Relay interfaces.

Row 280 includes a "Large Switch" device type with "Full" monitoring. A large switch is an SNMP manageable switch with 72 or more ports. For example, a large switch is a Cisco Catalyst 6500/8500 with 2-ATM, 72-10/100 Ethernet, 2-Serial Frame Relay and 20-TR interfaces. Some customer switches may be used for routing as well. In this situation, a determination should be made based upon the equipment's primary function as to whether to map the equipment to a router device type category or a switch device type category.

Row 285 includes a "Medium Switch" device type with "Full" monitoring. A medium switch is an SNMP manageable switch with 36-71 ports. For example, a medium switch is a Cisco Catalyst 5500-8500 with 2-ATM, 36-10/100 Ethernet, and 10-TR interfaces. Row 290 includes a "Small Switch" device type with "Full" monitoring. A small switch is an SNMP manageable switch with 2-35 ports. For example, a small switch is a Cisco Catalyst 2900 with 24-10/100 Ethernet interfaces.

Figure 3:
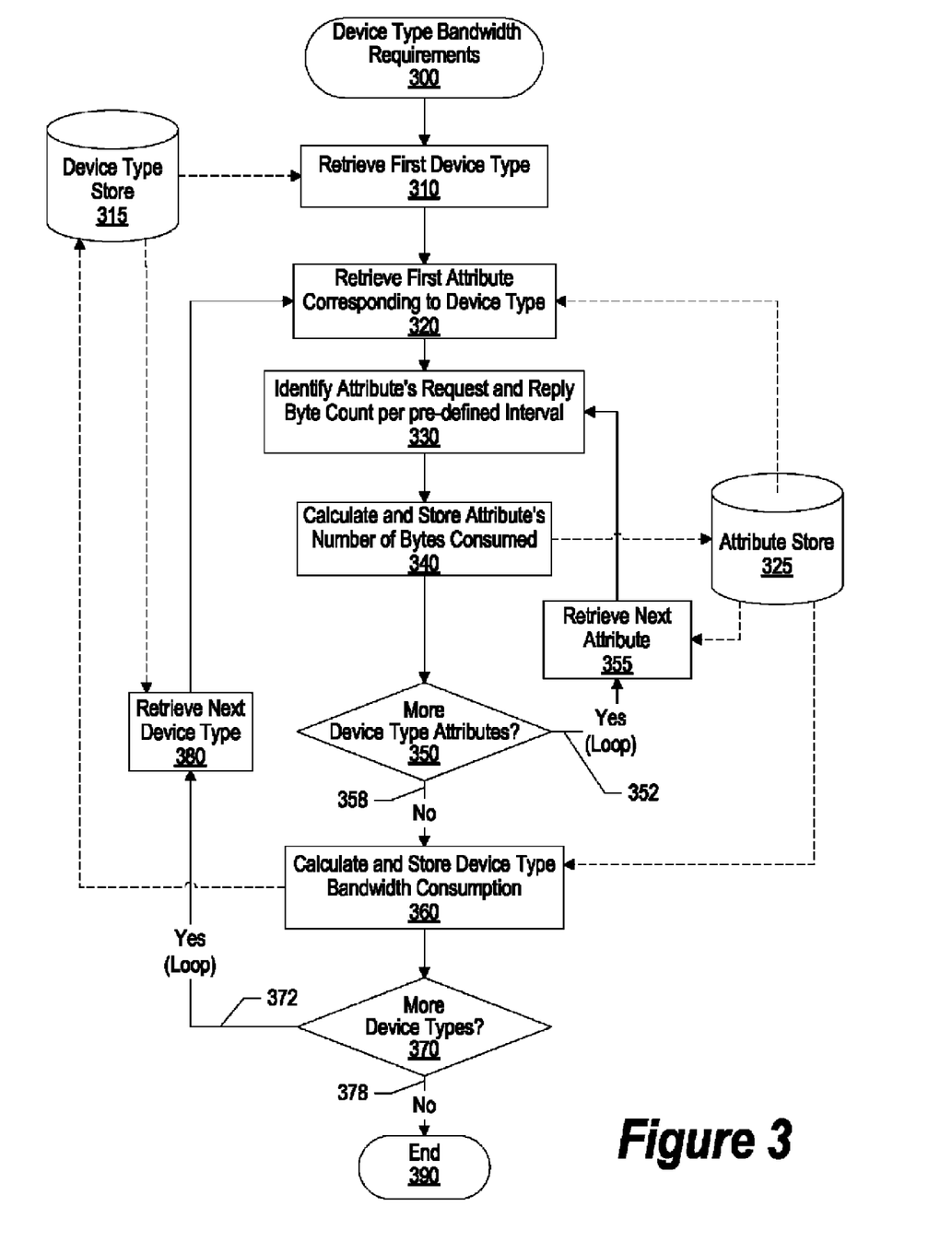
FIG. 3 is a flowchart showing steps taken in calculating a device type bandwidth for each device type category.

FIG. 3 is a flowchart showing steps taken in calculating device type bandwidth requirements for each device type category. Processing commences at 300, whereupon processing retrieves a first device type from device type store 315. Device type store 315 may be stored on a non-volatile storage area, such as a computer hard drive. For example, the first device type may be a "Large Router". Processing retrieves a first fault attribute corresponding to the device type from attribute store 325 at step 320. Using the example described above, a first fault attribute corresponding to "Large Router" is "Interface Utilization".

Processing identifies a number of bytes required for requests and replies corresponding to the fault attribute at step 330. Using the example described above, processing identifies 144 packets at 100 bytes each are required for interface utilization requests and 144 packets at 300 bytes each are required for interface utilization replies. Processing selects an interval period, such as fifteen minutes, and calculates an interval fault attribute byte count which is the number of bytes that a particular fault attribute requires per interval (step 340). Processing uses the same interval (i.e. fifteen minutes) for each fault attribute that it analyzes. Using the example described above, if each request and reply occurs every five minutes, the interval attribute byte count for the interface utilization attribute is as follows:

$$(144*100+144*300)*15 \text{ min.}/5 \text{ min.}=172{,}800 \text{ bytes}$$

Processing stores the interval fault attribute byte count in attribute store 320, and a determination is made as to whether there are more fault attributes to process corresponding to the retrieved device type (decision 350). If there are more fault attributes to process, decision 355 branches to "Yes" branch 352 which loops back to retrieve (step 355) and process the next fault attribute. This looping continues until there are no more fault attributes to process corresponding to the retrieved device type, at which point decision 350 branches to "No" branch 358.

Processing calculates a unit fault requirement for the retrieved device type by adding together each interval fault attribute byte count and dividing by a particular number in order to calculate a "byte count per second" bandwidth requirement. Using the example described above and assuming that other interval fault attribute byte counts were 100,000, 150,000, and 200,000, the large router's device type category bandwidth is calculated as follows:

$$(172{,}800+100{,}000+150{,}000+200{,}000)=622{,}800 \text{ bytes}$$
$$\text{(every 15 min.)}$$

$$622{,}800 \text{ bytes}/(15 \text{ min.}*60 \text{ sec})*8 \text{ bits/byte}=5{,}536 \text{ bits/sec.}$$

$$5{,}536 \text{ bits/sec.}/1000=5.536 \text{ Kbits/sec.}$$

Processing stores the unit fault requirement in a location corresponding to the retrieved device type in device type store 315. Processing proceeds through the same steps as described above to calculate a unit performance requirement using performance attributes. Device type bandwidth requirements for a particular device type include the device type's unit performance requirement and the device type's unit fault requirement. A determination is made as to whether there are more device type categories to process (decision 370). If there are more device type categories to process, decision 370 branches to "Yes" branch 372 which loops back to retrieve (step 380) and process the next device type. This looping continues until there are no more device types to process, at which point decision 370 branches to "No" branch 378 whereupon processing ends at 390.

Figure 4:
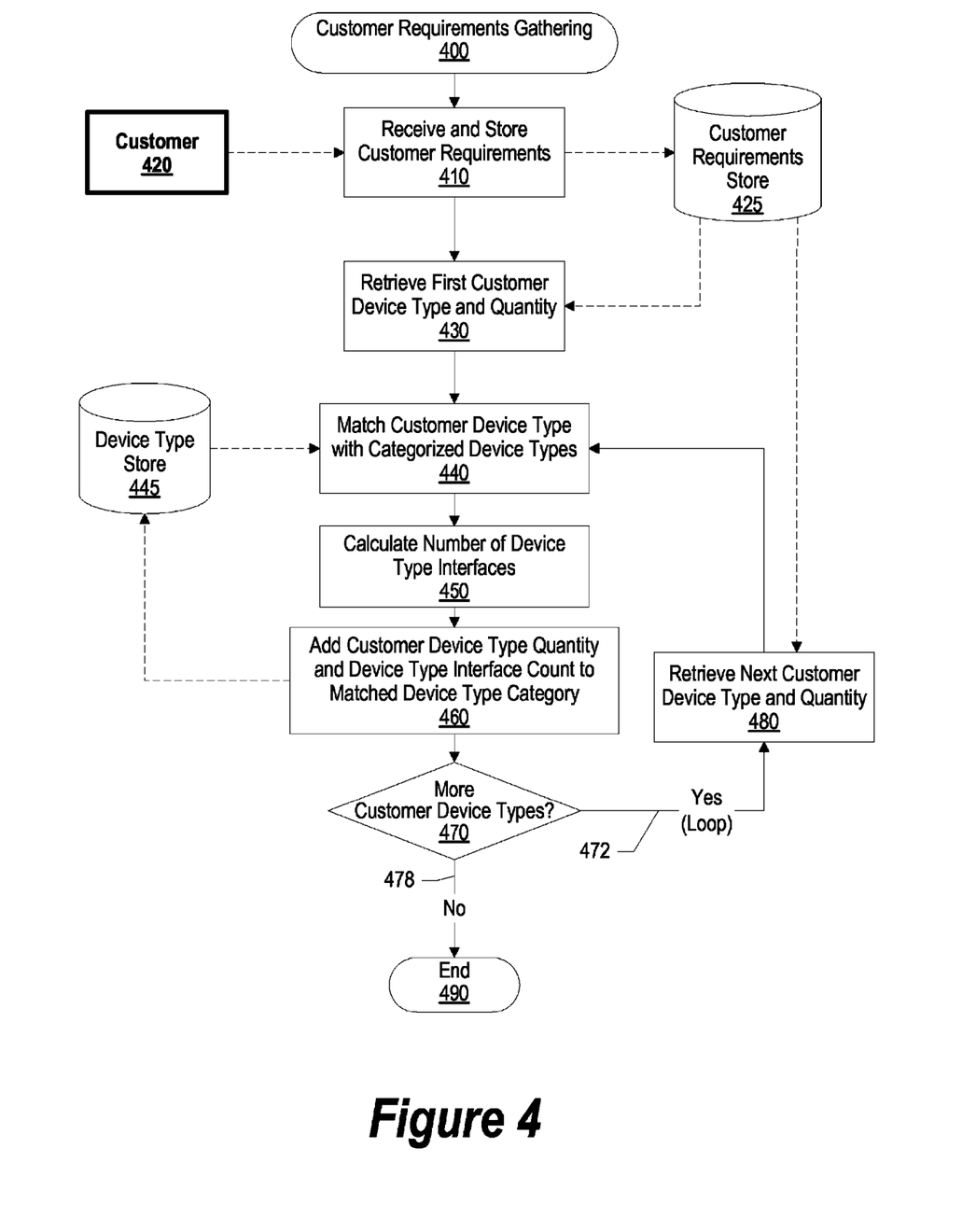
FIG. 4 is a flowchart showing steps taken in matching customer requirements to categorized device types.

FIG. 4 is a flowchart showing steps taken in mapping customer requirements to device type categories. Processing commences at 400, whereupon processing retrieves customer requirements from customer 420 and stores the customer requirements in data store 425. Processing may retrieve customer requirements using an automated process or by using a manual process. In an automated example, a specialized scanning/discovery procedure may be used to gather the customer device information from a customer location. In a manual example, customer 420 may provide a list of customer requirements in which processing stores in data store 425.

Processing retrieves a first customer device type requirement which includes the quantity of the particular device type (step 430). Processing retrieves device type categories from device type store 445, and maps the customer device type to one of the device type categories at step 450. For example, a customer may have fifty Cisco 7500 routers that have between 36-74 ports whereby processing maps the routers to a "Large Router" category. Device type store 445 may be stored on a non-volatile storage area, such as a computer hard drive.

Processing calculates a number of device type interfaces corresponding to the first customer device type at step 450. Using the example described above, processing multiplies the number of customer devices (e.g. 50) times a pre-determined port number average (i.e. 48), which results in a number of interfaces corresponding to the first customer device type requirement (50*48=2,400 interfaces). In one embodiment, processing may use actual customer port quantities instead of using a pre-determined port number average when calculating the number of interfaces. Processing adds the customer device type quantities and the number of interfaces to the corresponding device type category located in device type store 445 (step 460). Using the example described above, processing adds 50 devices and 2,400 interfaces to the "Large Router" device type category.

A determination is made as to whether there are more customer device type requirements to process (decision 470). If there are more customer device types to process, decision 470 branches to "Yes" branch 472 which loops back to retrieve (step 480) and process the next customer device type requirement. This looping continues until there are no more customer device type requirements to process, at which point decision 470 branches to "No" branch 478 whereupon processing ends at 490.

Figure 5:
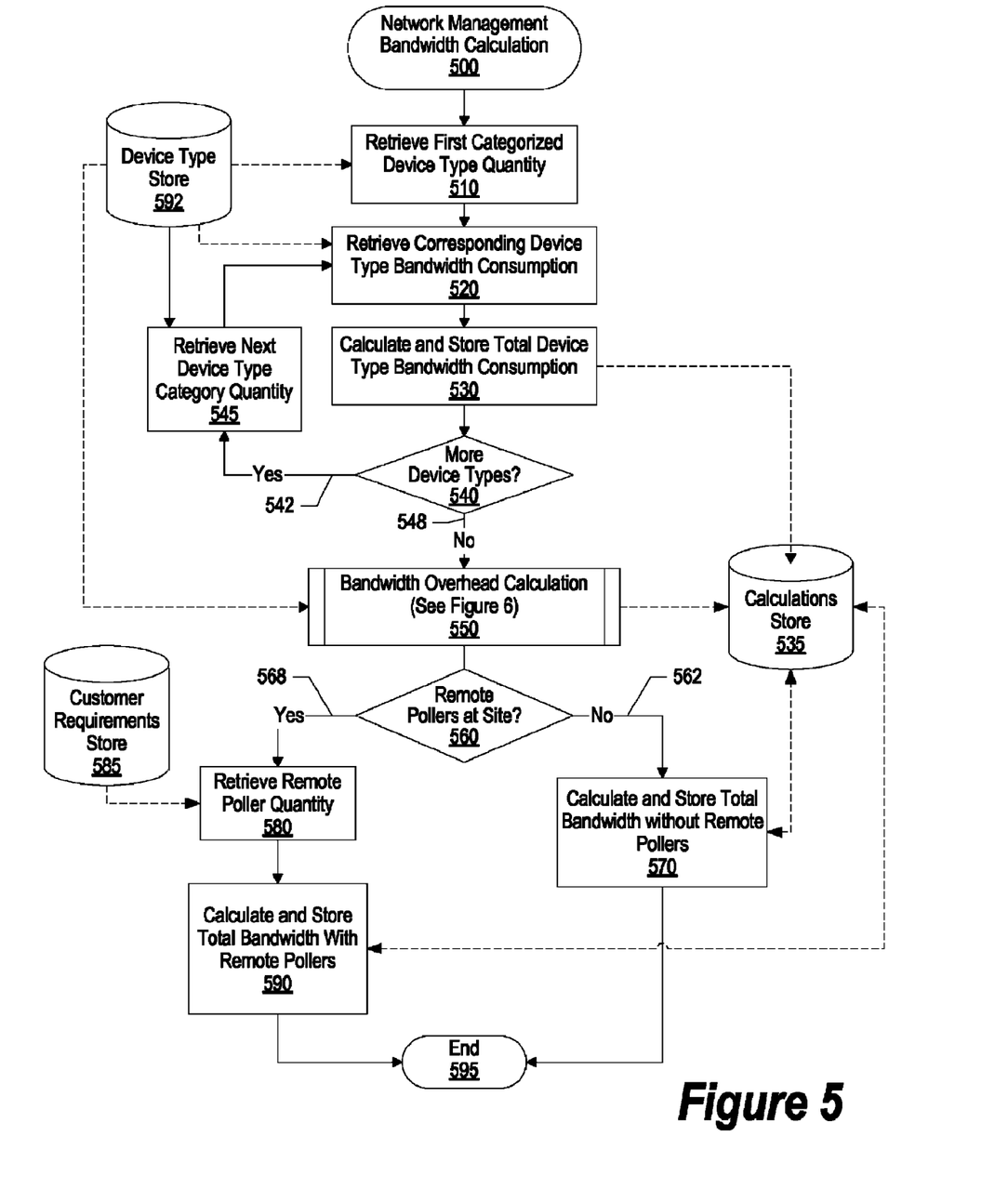
FIG. 5 is a flowchart showing steps taken in calculating network management bandwidth.

FIG. 5 is a flowchart showing steps taken in calculating a network management bandwidth requirement. Processing commences at 500, whereupon processing retrieves a device type quantity from device type store 515 (step 510). The device type quantity includes a number of customer device types that have been mapped to a device type category (see FIG. 4 and corresponding text for further details regarding customer device type mapping). For example, a customer may have 100 "large routers". Device type store 515 may be stored on a non-volatile storage area, such as a computer hard drive.

Processing retrieves a unit fault requirement from device type store 515 corresponding to the device type category (step 520). The unit fault requirement is calculated using fault attribute information corresponding to the particular device type (see FIG. 3 and corresponding text for further details regarding unit fault requirement calculations). Using the example described above, the "Large Router" may have a corresponding unit fault requirement of "5.5 Kbits/sec.".

Processing multiplies the unit fault requirement to the device type quantity which results in a device type total fault requirement (step 530). Using the example described above, the device type total fault requirement for a large router is calculated as follows:

100*5.5 Kbits/sec=550 Kbits/sec

Processing stores the device type total fault requirement in calculations store 535. Calculations store 535 may be stored on a non-volatile storage area, such as a computer hard drive. Processing proceeds through the same steps as described above to calculate a device type total performance requirement using unit performance requirements for each "fully" monitored device.

A determination is made as to whether there are more device types to process (decision 540). If there are more device types to process, decision 540 branches to "Yes" branch 542 which loops back to retrieve (step 545) and process the next device type. This looping continues until there are no more device types to process, at which point decision 540 branches to "No" branch 548. Processing calculates a bandwidth overhead which includes bandwidth required for overhead activities, such as with bundled products (pre-defined process block 550, see FIG. 6 and corresponding text for further details). Processing stores the overhead bandwidth calculation in calculations store 535.

A determination is made as to whether the customer's location includes remote polling equipment (decision 560). For example, the customer may have polling equipment installed to provide processing relief to a primary management server or to limit polling traffic across slow links. If the customer's location does not include remote polling equipment, decision 560 branches to "No" branch 562 whereupon processing calculates a network management bandwidth requirement by adding together each device type requirement and the overhead bandwidth (step 570) as shown below and stores the network management bandwidth requirement in calculations store 535:

Network Management Bandwidth Requirement=overhead bandwidth+sum of device type total fault requirement+sum of device type total performance requirement On the other hand, if the customer's location includes remote polling equipment, decision 560 branches to "Yes" branch 568 whereupon processing retrieves a remote poller quantity from customer requirements store 585 (step 580). The remote poller quantity is provided by a customer during customer requirements gathering and corresponds to the number of polling devices at the customer's location. Processing calculates a network management bandwidth requirement using each device type requirement, the overhead bandwidth, and the number of polling devices at the customer's location:

Network Management Bandwidth=overhead bandwidth+(0.95*sum total device type performance requirement)+(0.25*number of polling equipment*8)

Processing stores the network management bandwidth in calculations store 535, and processing ends at 595.

Figure 6:
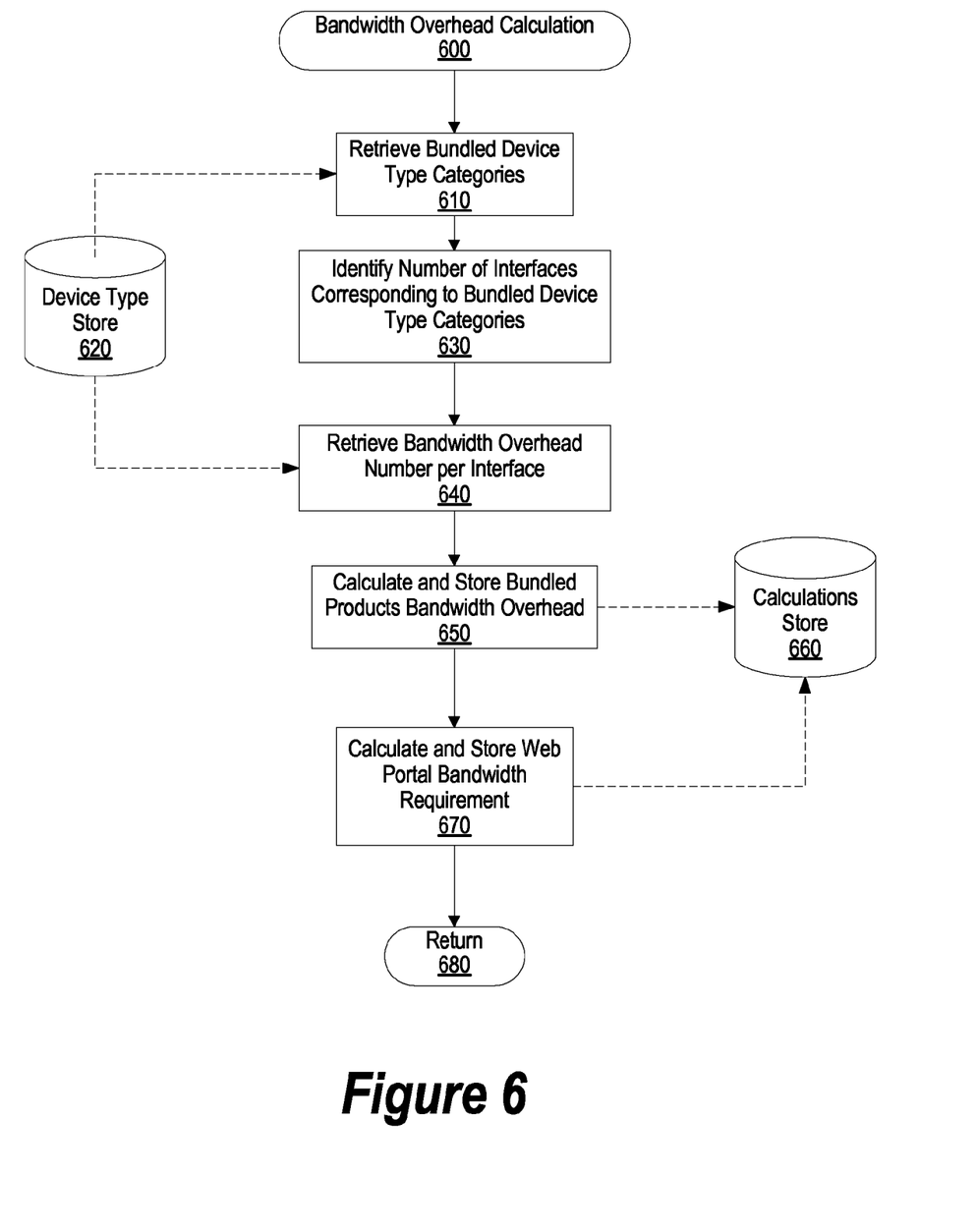
FIG. 6 is a flowchart showing steps taken in calculating overhead bandwidth.

FIG. 6 is a flowchart showing steps taken in calculating overhead bandwidth. Overhead bandwidth is bandwidth that is required for miscellaneous monitoring activities, such as with bundled products. For example, CiscoWorks products have overhead associated with firmware upgrades and device operation monitoring. Processing commences at 600, whereupon processing retrieves bundled device type categories from device type store 620. Bundled device type categories correspond to device types that are "bundled", such as "CiscoWorks" products. Processing identifies a bundled products interface number by adding together the number of interfaces for each bundled device type (step 630).

Bundled products occasionally require bandwidth to perform particular functions, such as firmware upgrades. Processing retrieves an overhead per interface bandwidth requirement from device type store 620 at step 640. The overhead per interface bandwidth requirement is calculated by analyzing the bundled product's components and functions, and determining an amount of bandwidth that is required for each component and function.

Processing calculates a bundled products bandwidth by multiplying the overhead per interface bandwidth with the bundled products interface quantity, and stores the bundled products bandwidth in calculations store 660. Calculations store 660 may be stored on a non-volatile storage area, such as a computer hard drive. Processing calculates a web portal bandwidth and stores it in calculations store 660 at step 670. The web portal bandwidth corresponds to customer access to a web portal across a premise link for activities such as report viewing. Processing returns at 680.

Figure 7:
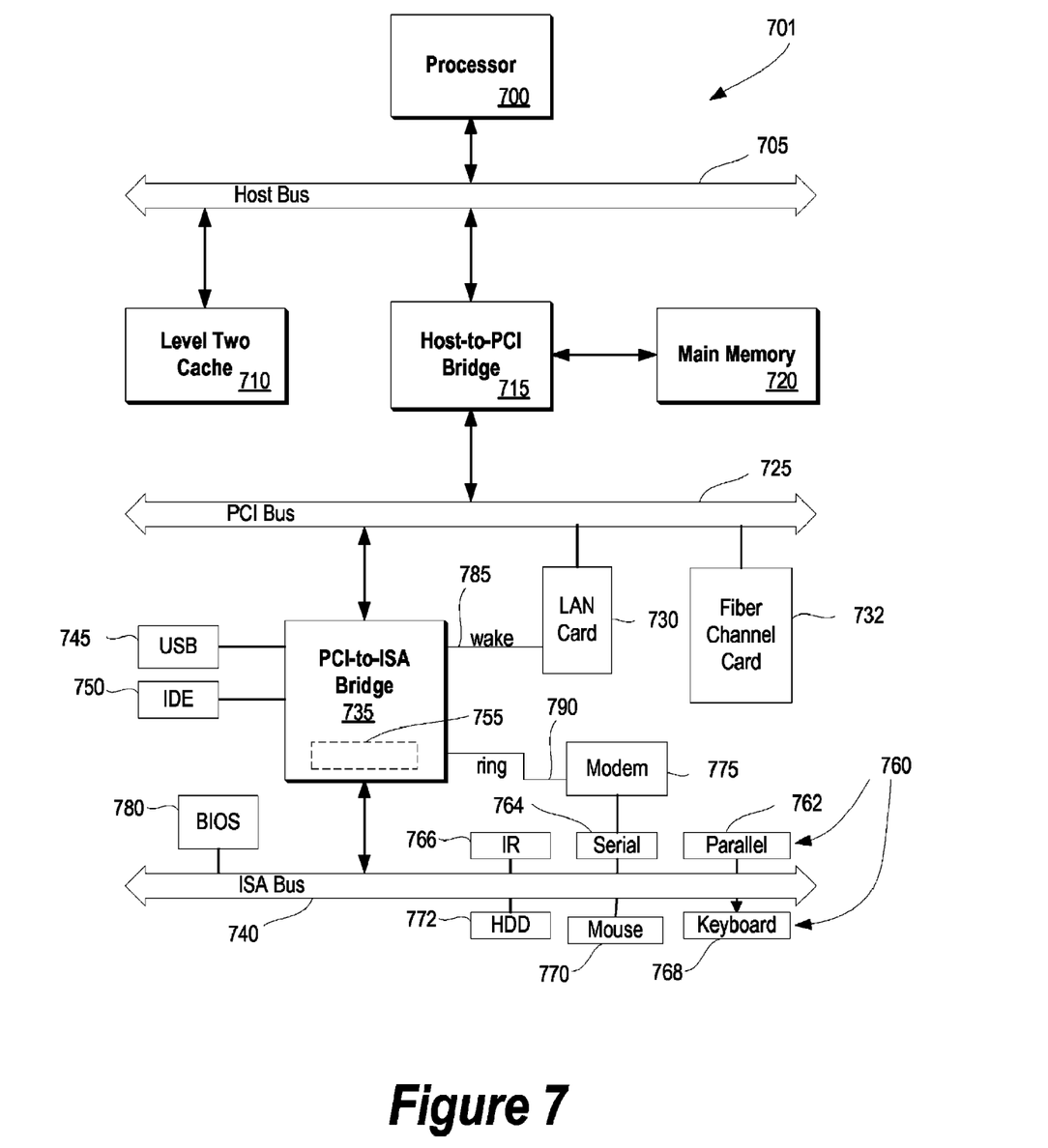
FIG. 7 is a block diagram of an information handling system capable of implementing the present invention.

FIG. 7 illustrates information handling system 701 which is a simplified example of a computer system capable of performing the invention described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including Computer Readable Storage Media (CRSM) such as magnetic storage media, optical storage media, flash memory, random access memory, read only memory, or a communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system for identifying a communications link requirement, the information handling system comprising:
 a processor, a computer readable memory, and a computer readable storage medium;
 first program instructions to select a first device type category from a plurality of device type categories, wherein each of the plurality of device type categories are different from each other;
 second program instructions to compute a first device type bandwidth requirement corresponding to the first device type category, the first device type bandwidth requirement including a first unit fault requirement and a first unit performance requirement, wherein the first unit fault requirement specifies a first unit fault bandwidth required to support a first device type's fault monitoring information;
 third program instructions to select a second device type category from the plurality of device type categories, the second device type category different from the first device type category;
 fourth program instructions to compute a second device type bandwidth requirement corresponding to the second device type category, the second device type bandwidth requirement including a second unit fault requirement and a second unit performance requirement, wherein the second unit fault requirement specifies a second unit fault bandwidth required to support a second device type's fault monitoring information, wherein the second device type's fault monitoring information is different than the first device type's fault monitoring information;

fifth program instructions to receive a plurality of customer device type requirements, wherein the plurality of customer device type requirements include a first customer device type requirement and a second customer device type requirement, the first customer device type requirement including a first customer device type quantity and the second customer device type requirement including a second customer device type quantity;

sixth program instructions to map the plurality of customer device type requirements to the plurality of device type categories, the mapping resulting in matching the first customer device type requirement to the first device type category, and matching the second customer device type requirement to the second device type category;

seventh program instructions to calculate, in response to the mapping, a first device type total bandwidth requirement by multiplying the first customer device type quantity to the first device type bandwidth requirement, and to calculate a second device type total bandwidth requirement by multiplying the second customer device type quantity to the second device type bandwidth requirement;

eighth program instructions to calculate a network management bandwidth requirement that includes both the first device type total bandwidth requirement and the second device type total bandwidth requirement;

ninth program instructions to identify the communications link requirement using the network management bandwidth requirement; and wherein the first, second, third, fourth, fifth, sixth, seventh, eighth, and ninth program instructions are stored on the computer readable storage medium for execution by the processor via the computer readable memory.

2. The information handling system as described in claim 1 further comprising:

tenth program instructions to determine a bundled device type interface quantity;

eleventh program instructions to retrieve a bundled device type overhead bandwidth from one of the nonvolatile storage devices;

twelfth program instructions to calculate a bundled products bandwidth overhead using the bundled device type interface quantity and the bundled device type overhead bandwidth;

thirteenth program instructions to include the bundled products bandwidth overhead in the network management bandwidth requirement; and wherein the tenth, eleventh, twelfth, and thirteenth program instructions are stored on the computer readable storage medium for execution by the processor via the computer readable memory.

3. The information handling system as described in claim 1 wherein the device type category is selected from the group consisting of a multi-interface MIB category, a very large router, a large router, a medium router, a small router, a large switch, a medium switch, and a small switch.

4. A computer program product for calculating a network management bandwidth requirement, said computer program product comprising:

a computer hardware device;

first program instructions to select a first device type category from a plurality of device type categories, wherein each of the plurality of device type categories are different from each other;

second program instructions to compute a first device type bandwidth requirement corresponding to the first device type category, the first device type bandwidth requirement including a first unit fault requirement and a first unit performance requirement, wherein the first unit fault requirement specifies a first unit fault bandwidth required to support a first device type's fault monitoring information, wherein the second device type's fault monitoring information is different than the first device type's fault monitoring information;

third program instructions to select a second device type category from the plurality of device type categories, the second device type category different from the first device type category;

fourth program instructions to compute a second device type bandwidth requirement corresponding to the second device type category, the second device type bandwidth requirement including a second unit fault requirement and a second unit performance requirement, wherein the second unit fault requirement specifies a second unit fault bandwidth required to support a second device type's fault monitoring information;

fifth program instructions to receive a plurality of customer device type requirements, wherein the plurality of customer device type requirements include a first customer device type requirement and a second customer device type requirement, the first customer device type requirement including a first customer device type quantity and the second customer device type requirement including a second customer device type quantity;

sixth program instructions to map the plurality of customer device type requirements to the plurality of device type categories, the mapping resulting in matching the first customer device type requirement to the first device type category, and matching the second customer device type requirement to the second device type category;

seventh program instructions to calculate, in response to the mapping, a first device type total bandwidth requirement by multiplying the first customer device type quantity to the first device type bandwidth requirement, and to calculate a second device type total bandwidth requirement by multiplying the second customer device type quantity to the second device type bandwidth requirement;

eighth program instructions to calculate a network management bandwidth requirement that includes both the first device type total bandwidth requirement and the second device type total bandwidth requirement;

ninth program instructions to identify the communications link requirement using the network management bandwidth requirement; and wherein the first, second, third, fourth, fifth, sixth, seventh, eighth, and ninth program instructions are stored on the computer hardware device.

5. The computer program product as described in claim 4 further comprising:

tenth program instructions to determine a bundled device type interface quantity;

eleventh program instructions to retrieve a bundled device type overhead bandwidth;

twelfth program instructions to calculate a bundled products bandwidth overhead using the bundled device type interface quantity and the bundled device type overhead bandwidth;

thirteenth program instructions to include the bundled products bandwidth overhead in the network management bandwidth requirement; and wherein the tenth, eleventh, twelfth, and thirteenth program instructions are stored on the computer hardware device.

6. The computer program product as described in claim 4 wherein the device type category is selected from the group consisting of a multi-interface MIB category, a very large router, a large router, a medium router, a small router, a large switch, a medium switch, and a small switch.

7. The computer program product as described in claim 4, further comprising:

fourteenth program instructions to determine whether one or more remote pollers exist;

fifteenth program instructions to retrieve a remote poller quantity corresponding to the remote pollers based upon the determination;

sixteenth program instructions to calculate a remote poller bandwidth using the remote poller quantity;

seventeenth program instructions to include the remote poller bandwidth in the network management bandwidth requirement; and wherein the fourteenth, fifteenth, sixteenth, and seventeenth program instructions are stored on the computer hardware device.

\* \* \* \* \*